(12) United States Patent
Samar

(10) Patent No.: US 6,563,514 B1
(45) Date of Patent: May 13, 2003

(54) SYSTEM AND METHOD FOR PROVIDING CONTEXTUAL AND DYNAMIC INFORMATION RETRIEVAL

(75) Inventor: Vipin Samar, Cupertino, CA (US)

(73) Assignee: Extensio Software, Inc., Cupertino, CA (US)

( * ) Notice: Subject to any disclaimer, the term of this patent is extended or adjusted under 35 U.S.C. 154(b) by 0 days.

(21) Appl. No.: 09/548,586

(22) Filed: Apr. 13, 2000

(51) Int. Cl.⁷ .................................................. G09G 5/00
(52) U.S. Cl. ......................... 345/711; 345/714; 345/715
(58) Field of Search ................................ 345/711, 714, 345/715, 747, 772; 707/2, 3, 4, 5

(56) References Cited

U.S. PATENT DOCUMENTS

| | | | | |
|---|---|---|---|---|
| 5,572,643 A | * | 11/1996 | Judson | 379/88.13 |
| 5,754,176 A | * | 5/1998 | Crawford | 345/711 |
| 6,078,935 A | * | 6/2000 | Nielsen | 345/707 |
| 6,098,065 A | * | 8/2000 | Skillen et al. | 707/10 |
| 6,236,981 B1 | * | 5/2001 | Hill | 380/46 |
| 6,269,361 B1 | * | 7/2001 | Davis et al. | 707/2 |
| 6,437,800 B1 | * | 8/2002 | Malamud et al. | 345/705 |

OTHER PUBLICATIONS

Lycos Advanced Search. http://lycospro.lycos.com. Captured by the Wayback Machine (http://web.archive.org) on Apr. 29, 1999. 1 page.*

* cited by examiner

Primary Examiner—John Cabeca
Assistant Examiner—Brian Detwiler
(74) Attorney, Agent, or Firm—Blakely, Sokoloff, Taylor & Zafman LLP

(57) ABSTRACT

In accordance with a set of previously defined options relating to such things as information retrieval, applications, items of interest, payment options, etc., a software program configures the computer system on which it executes to access information on an item over which a pointer has hovered for a preset time without the user having to provide any additional inputs. The information may be retrieved from a local or remote location. The information may be free, paid for by the user, a sponsor, or a third party. The information desired by the user is presented visual, audibly, or both.

46 Claims, 8 Drawing Sheets

SYSTEM AND METHOD FOR PROVIDING CONTEXTUAL AND DYNAMIC INFORMATION RETRIEVAL

FIELD OF THE INVENTION

The present invention pertains to the field of information retrieval using computer networks. More particularly, the present invention relates to providing supplementary relevant information to the user of a computer on a network without changing the user's context.

BACKGROUND OF THE INVENTION

The explosion in growth of the World Wide Web (Web), and particularly the Internet and web sites, has resulted in vast amounts of information being available to users. Web sites often use HyperText Markup Language (HTML), embedded Universal Resource Locators (URL), and other "tag" mechanisms to provide hyperlinks between Web pages as well as interactivity and links to additional information or resources.

Current ways of accessing information on the Web have certain shortcomings. For example, a common way for acquiring information on the Web requires the user, when viewing a Web page, to actively select, (e.g., via a mouse click) a source or hyperlink for the additional information. It is sometimes undesirable for users to have to select a hyperlink to view additional information related to a Web page. The user may become lost or have difficulty returning to his starting point if he does this action repeatedly. Another approach requires the user to click on a word to open a menu, which may then take the user to another page. Again, the requirement for the user to click and further select is present. Another approach uses a combination of a keystroke and a mouse click, e.g., holding down the "Alt" key while clicking on a word. With these navigation approaches, the user is often taken to another Web page, menu, or another Web browser opens up with the information. Often the user's screen becomes cluttered, and the user may become confused, frustrated, or unable to return to where he wants. The result may be lost Web site consumer sales and upset users. The ability to maintain the same user context while providing supplemental information may reduce these undesirable results.

Additionally, information available to a user selecting a hyperlink generally has several other limitations. One is the static nature of the information. The information is intended to be viewed by anyone and so is necessarily generic and general purpose in nature. Thus, it is not tailored to a particular viewer. Another limitation is the static nature of the link itself. The link is not capable of changing based upon a particular viewer. The ability to personalize the nature of the information and its retrieval based on user-defined criteria may be beneficial.

SUMMARY OF THE INVENTION

A method of providing information to a user of a processing system includes identifying a position of a user-controlled pointer on a display device of the processing system, determining if the position coincides with an item of interest, and if the position coincides with the item of interest, retrieving the information associated with the item of interest dynamically without requiring any further action from the user, and displaying the information on the display device.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A system and method for identifying and retrieving information for a computer user are described. What the system and method disclosed herein may include, among other things, is a system in which, over communication medium such as the Internet in an interactive scenario, a pointer or cursor is located by a user over an item of interest, and without further interaction from the user, information related to the item of interest is retrieved and displayed to the user. The user is not required to click on (or otherwise select) a hypertext link. Similarly, the user is not required to provide any additional input; no mouse click, no keyboard input, no voice input, and no user biometric input. As described in greater detail below, by enabling easier retrieval of information the user's performance, experience, and enjoyment of using the software or Internet may be enhanced. This approach provides a new level of ease for the user, and a potential new source of revenue to information providers, advertisers, and sponsors. The techniques described below include a computer software application which, when executed on the computer system of an end user, configures that computer system so that the user may initially select from a variety of information sources. Thereafter, by simply positioning a pointer over an item of interest, available information is communicated to the user automatically. While it is envisioned that the techniques described below may be aligned with the use of standard applications, such as a word processor, Web browser, etc., it is to be understood that the techniques presented need not be implemented within the application, although that is one possible implementation approach. Thus, the techniques described below can be implemented "on top of" any application and do not need to be part of the application. The information that is presented to the user may also involve visual or audible output, or both.

Note that to facilitate description, certain software elements are characterized in this description as having the ability to perform various functions or to "provide," "cause," or "implement" various functions, or other similar characterizations. It will be recognized, however, that what is meant by such characterizations is that the described functions occur as a result of a processor executing software. Note however, that the techniques described, can be embedded in hardware, software, or a combination of hardware and software. Note also that the processor executing software and/or the techniques embedded in hardware, software, or a combination of hardware and software may be at a client system, a server system, or a combination of client and server system.

Figure 1:
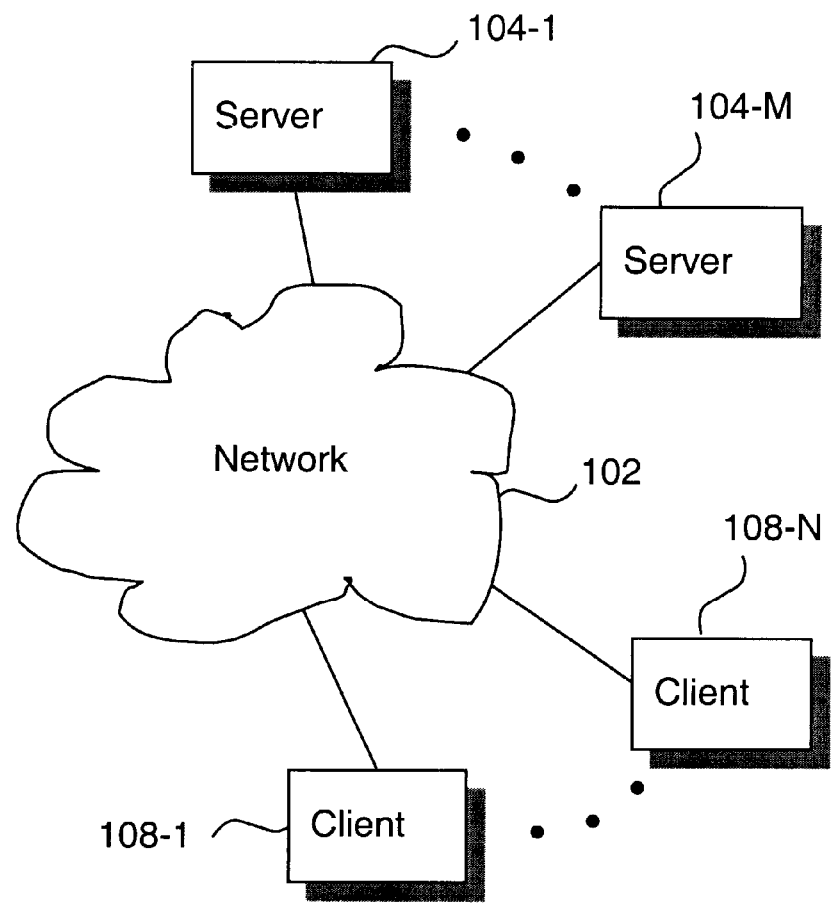
FIG. 1 illustrates a number of client and server computer systems connected to each other via a network.

FIG. 1 illustrates a network environment in which the techniques mentioned above may be applied. As shown, several computer systems in the form of M servers 104-1 through 104-M and N clients 108-1 through 108-N are connected to each other via a network, which may be, for example, the Internet. Note that alternatively the network 102 might be or include one or more of: a Local Area Network (LAN), Wide Area Network (WAN), satellite link, fiber network, cable network, or a combination of these and/or others. The system and method described herein may be applied to essentially any type of software application, such as a Web browser, a word processor, a spreadsheet, a database application, multimedia editing, etc. To facilitate explanation, this description will focus on a Web browser executing on a conventional personal computer in an Internet environment.

Figure 2:
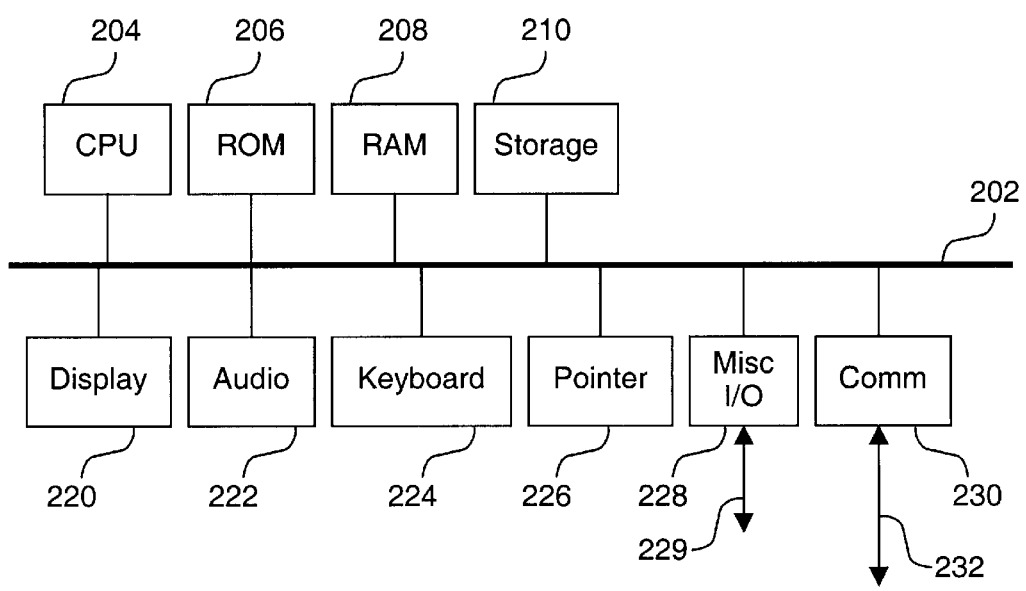
FIG. 2 is a block diagram of a computer system.

FIG. 2 illustrates a conventional personal computer in block diagram form, which may be representative of any of the clients and servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), etc. The CPU 204 may be a single, multiple, or even a distributed computing resource. The ROM 206 may be any type of non-volatile memory, which may be programmable such as, mask programmable, flash, etc. RAM 208 may be, for example, static, dynamic, synchronous, asynchronous, or any combination. Storage 210, may be Compact Disc (CD), Digital Versatile Disk (DVD), hard disks, optical disks, tape, flash, memory sticks, video recorders, etc. Display 220 might be, for example, a Cathode Ray Tube (CRT), Liquid Crystal Display (LCD), a projection system, Television (TV), etc. Audio 222 may be a monophonic, stereo, three dimensional sound card, etc. The keyboard 224 may be a keyboard, a musical keyboard, a keypad, a series of switches, etc. The pointer 226, may be, for example, a mouse, a touchpad, a trackball, joystick, etc. I/O devices 228, might be a voice command input device, a thumbprint input device, a smart card slot, a Personal Computer Card (PC Card) interface, virtual reality accessories, etc., which may optionally connect via an input/output port 229 to other devices or systems. An example of a miscellaneous I/O device 228 would be a Musical Instrument Digital Interface (MIDI) card with the I/O port 229 connecting to the musical instrument(s). Communications device 230 might be, for example, an Ethernet adapter for local area network (LAN) connections, a satellite connection, a settop box adapter, a Digital Subscriber Line (xDSL) adapter, a wireless modem, a conventional telephone modem, a direct telephone connection, a Hybrid-Fiber Coax (HFC) connection, cable modem, etc. The external connection port 232 may provide for any interconnection, as needed, between a remote device and the bus system 202 through the communications device 230. For example, the communications device 230 might be an Ethernet adapter, which is connected via the connection port 232 to, for example, an external DSL modem. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

Referring back to FIG. 1, clients 108-1 through 108-N are effectively connected to web sites, search engines, and/or database resources represented by servers, such as servers 104-1 through 104-M, via the network 102. The web browser and/or other applications are generally running on the clients 108-1 through 108-N, while web pages and information being browsed generally resides on the servers 104-1 through 104-M. For ease of explanation, a single client 108-1 will be considered to illustrate one embodiment of the present techniques. It will be readily apparent that such techniques can be easily applied to multiple clients. In FIG. 1, the client 108-1 might be running a web browser application that has the capability to accept browser "plugins." Browser plugins are devices, generally implemented in software, that can access, interact, enhance, and/or compliment the functionality of the main application (e.g., the browser). The invention's implementation of such a plugin shall be referred to herein as "an information bubble plugin" or "bubble software" for short. The bubble software configures a processing system such that when a pointer or cursor is positioned by a user over an item of interest, and without further interaction from the user, information related to the item of interest is retrieved locally and/or remotely and then presented to the user. The user is not required to click on (or otherwise select) a hypertext link.

The information that is presented to the user may also involve visual or audible output, or both. The bubble software may be installed either by the client user locally via a machine-readable medium or storage device, for example, a CD-ROM, DVD, or the other storage medium. Alternatively, the client user may download the bubble software or any updates thereto from a server via the Internet and/or other network, and then install the bubble software. A description of the method of installation of the bubble software is not necessary for an understanding of the present invention. The server 104-1 in this explanation is a web site that client 108-1 is configured to access.

Figure 3:
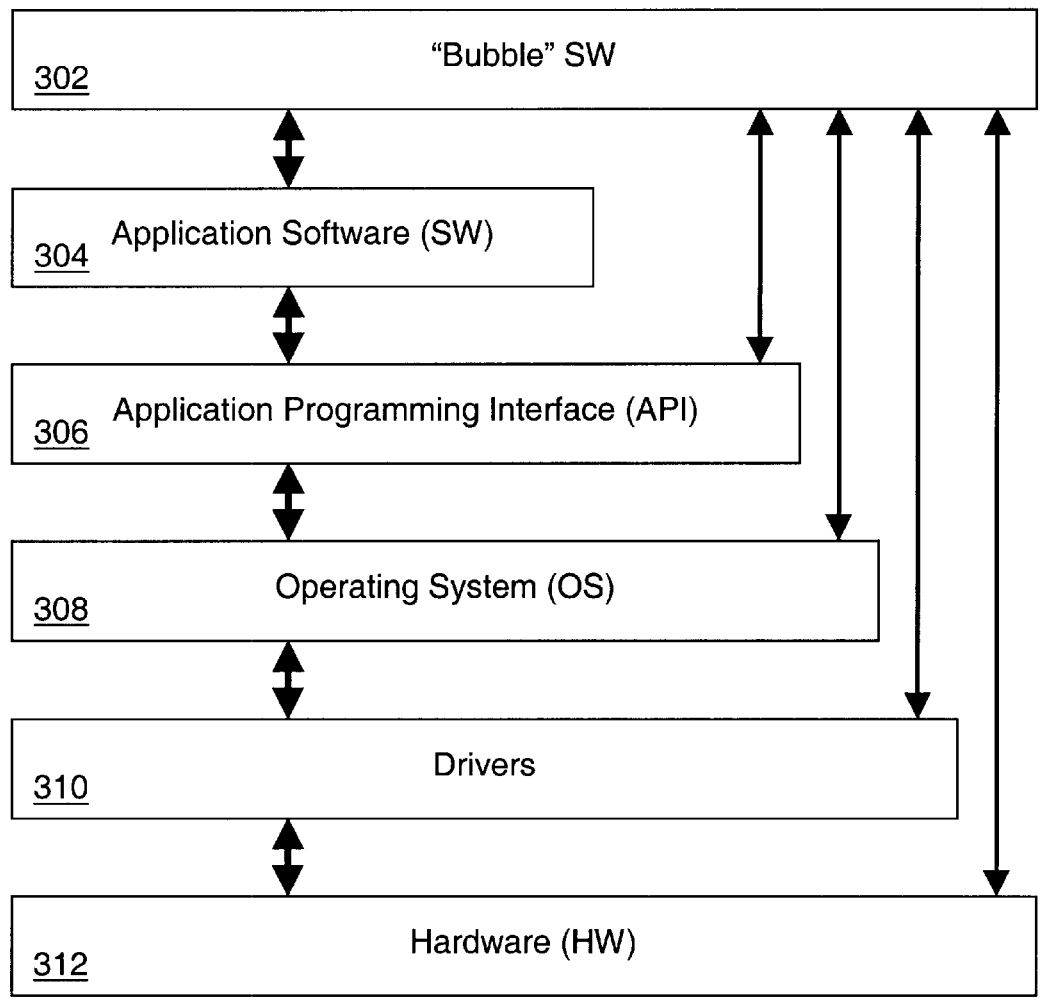
FIG. 3 conceptually illustrates an architecture for implementing the information retrieval and display technique.

FIG. 3 conceptually illustrates a common computer system architecture showing the major levels of interaction between resources. Conceptually, and in order of increasing abstraction, HardWare (HW) 312 interacts with low-level drivers 310, which then communicate with the Operating System (OS) 308, which has an Application Programming Interface (API) 306 for use by application software 304. In one embodiment, the application software 304 is a web browser. The bubble software 302 interacts with the application software 304 via a plugin capability. In another embodiment, the bubble software might be part of the application software 304. Note also that the bubble software 302 may have access to the API 306, the OS 308, drivers 310, and hardware 312.

Once the user has installed the bubble software on the computer, the user may set program options, such as the source of inputs, program defaults, favorites, preferred providers, applications, etc., through standard menuing toolbar selection systems, or these options may be set for the user by a service provider. The bubble software, by having access to the system resources, is able to sense automatically without user interaction, for example, the mouse pointer location as displayed on the display device, as well as display information.

Figure 4:
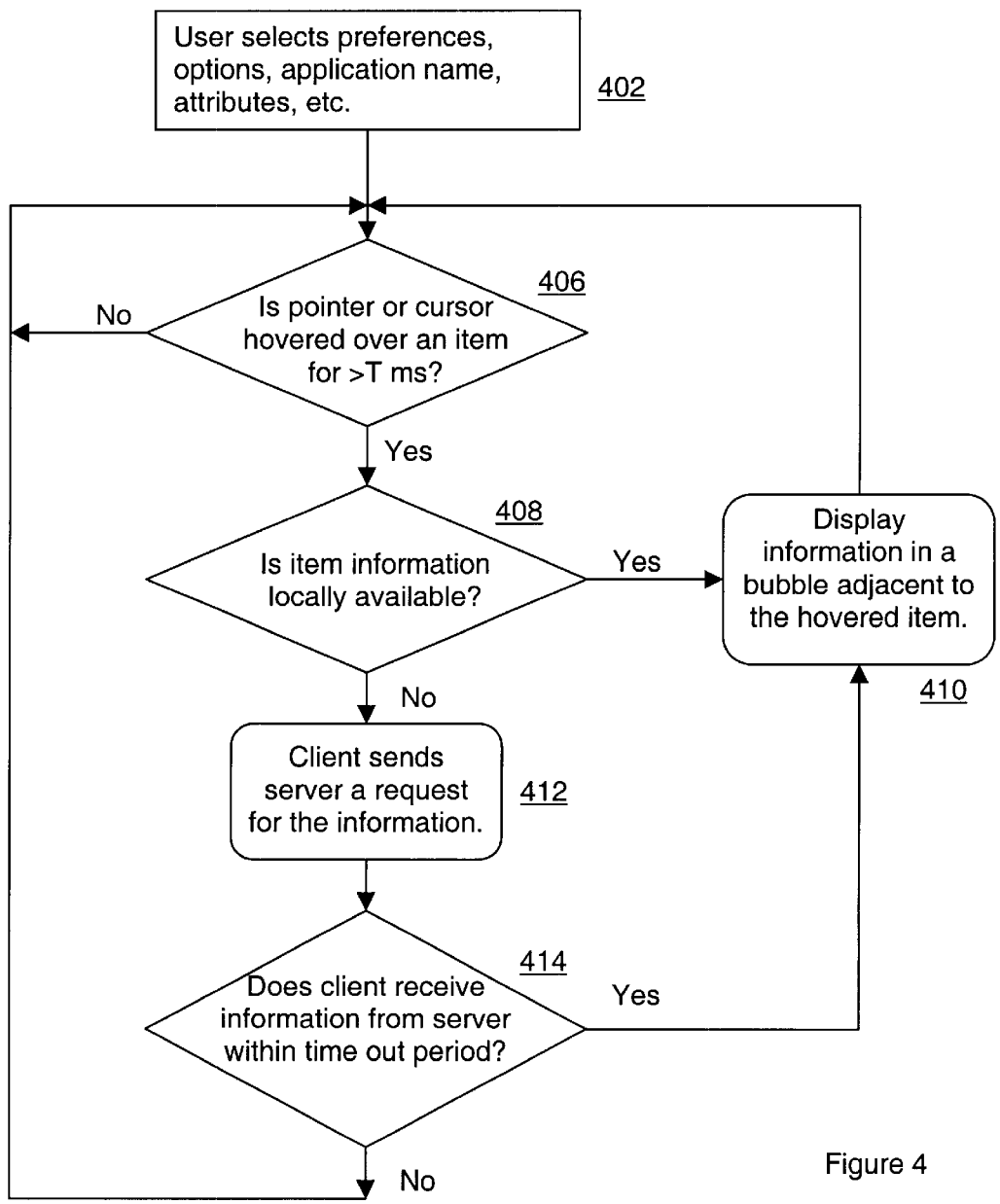
FIG. 4. is a flow diagram of a client-side process for selecting an item of interest, and then retrieving and displaying information on the item of interest.

FIG. 4 illustrates a flow diagram for one embodiment of a client-side process of performing a simple lookup of information regarding an item. This process may be implemented by the bubble software 302. Initially, at 402, the user of a client system selects from a bubble software menu toolbar, preferences, options, the application name, attributes, etc. For illustration purposes, assume that the user, at 402, has initially identified that the application they will be using is a word processor. Assume further, that the user has also indicated, via the bubble options and preferences, that they are interested in words (i.e. that the item of interest is a word), that the information the user would like displayed on the display device is the word's definition, that the user prefers information (in this example, the word definition) from a specified dictionary, and finally, perhaps a preference for a remote information server site. Once configured with the user's preferences for the bubble software 402, the bubble software 302 checks to see if the pointer or cursor has "hovered over" (i.e. is positioned in proximity to) an item, in this case a word, for at least a period of time T 406, where T may be, for example, onehalf second. If the hover time is not greater than the specified time T, then the process simply loops back to 406. When the hover time T over an item of interest, in this case a word, is satisfied at 406, the process proceeds to determine, at 408, if the information on the item of interest, in this case a word definition, is locally available. If the information on the item of interest, in this case a word definition, is available then this information is displayed in a "bubble" (e.g. a callout box) adjacent to the hovered item of interest, in this case a word, at 410. The process then loops back to 406. If the information is not available, then the bubble program, which is running on the client, sends a request for the information at 412 to a predefined server, as set by the user in the user preferences or by default. The client then checks to see if the information was received from the server at 414. If the information was received from the server within a predefined time out period, the program then finds the information available locally at 408, and proceeds to display the retrieved information at 410. If the information is not received from the server within the predefined time out period, then the bubble software loops back to 406.

Figure 5:
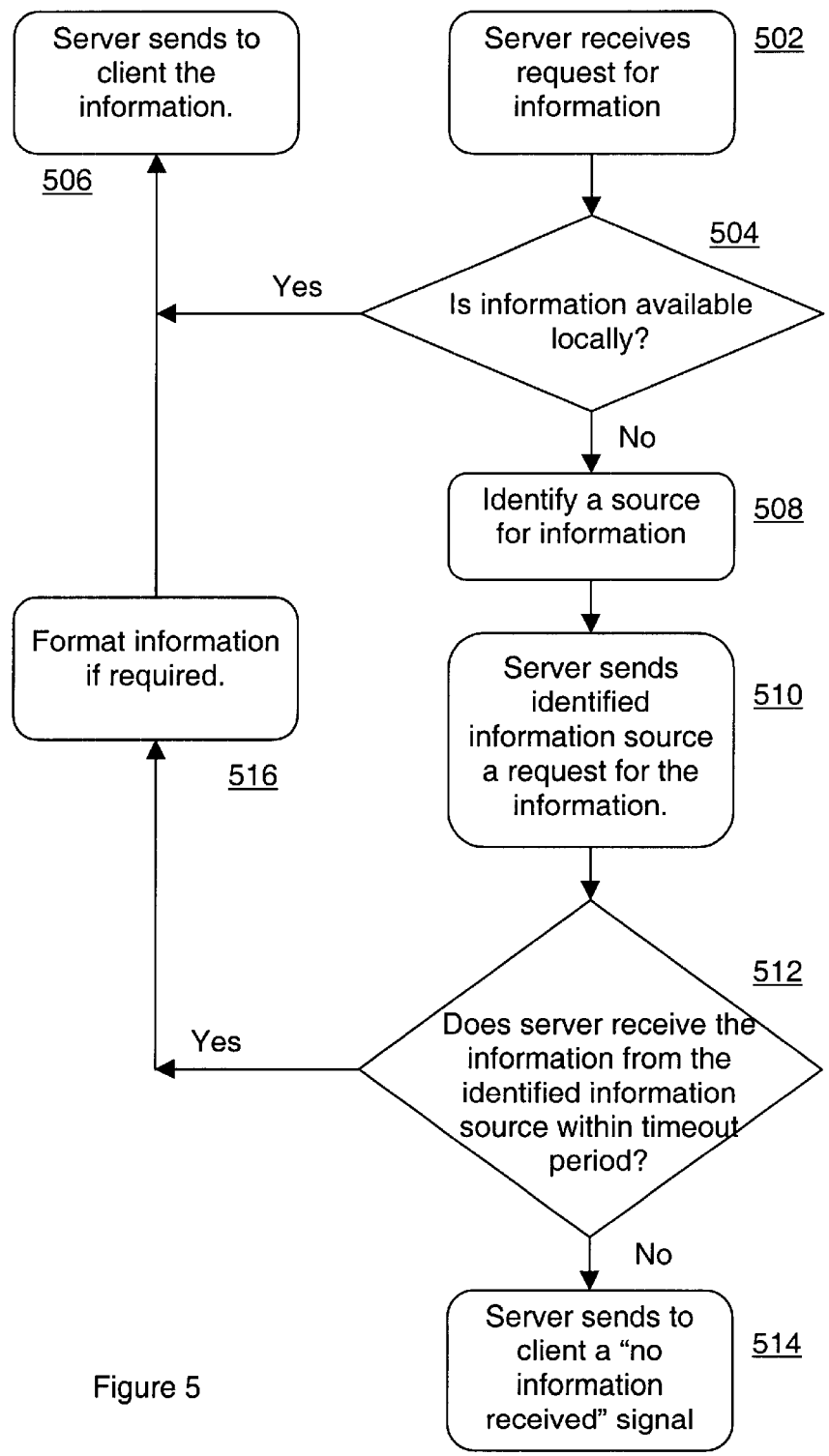
FIG. 5 is a flow diagram of a server-side process for looking up and sending information on an item of interest to a client.

FIG. 5 illustrates a flow diagram for a server-side process for retrieving information, which may be performed in conjunction with the client-side process of FIG. 4. The server receives the request for information at 502, in this case a word definition. The server then determines if this information is available locally at 504. If the information is available locally, then the server sends the information to the client at 506. If the information is not available locally, then the server identifies a source for the information at 508. The server then sends the identified information source a request for the information at 510. The server then checks to see if it has received the information from the information source within a timeout period at 512. If the server receives the information from the information source within the timeout period at 512, the information is then formatted if required at 516, and then the server then sends to the client the information at 506; otherwise, the server sends to the client a signal indicating that no information was received at 514. The identified source for information might be another database identified by a Universal Resource Locator (URL). The formatting if required 516, may consist of, but is not limited to, condensing the retrieved information, filtering the information, packaging the information with additional items, etc. For example, the retrieved information might consist of more data than the user requested in which case it would be condensed and filtered according to the user options. Additionally, a sponsor may be paying for the information, in which case an advertisement, logo, etc. may be packaged with the information and this entire formatted result sent to the client by the server 506.

Figure 6A:
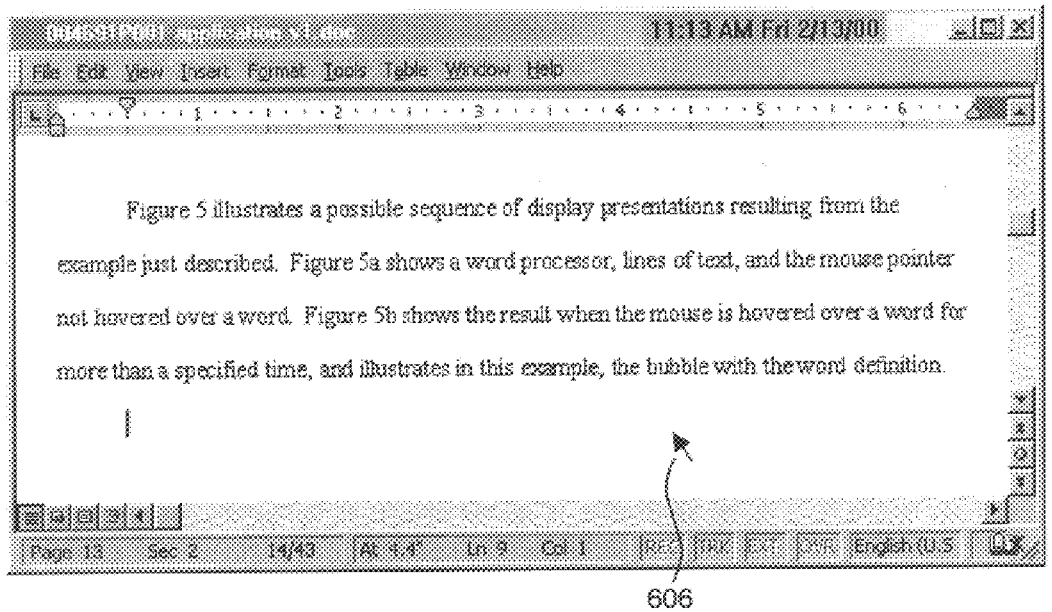
FIG. 6a shows a displayed window generated by a word processing application.
Figure 6B:
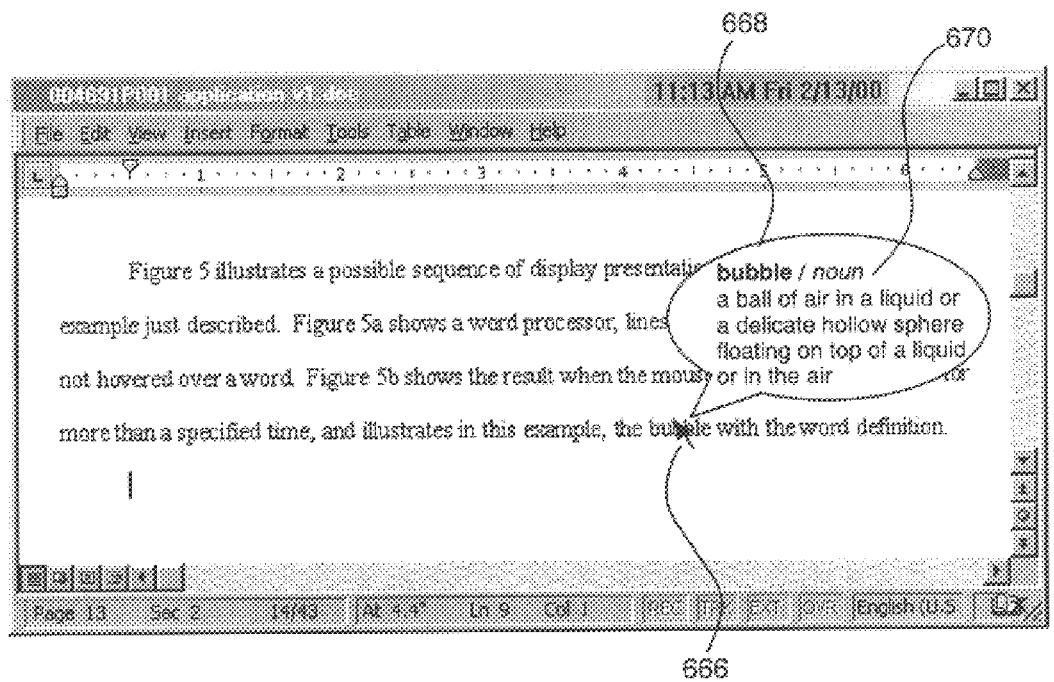
FIG. 6b shows a displayed window generated by a word processing application, including a bubble containing retrieved information.

FIG. 6 illustrates an example of two display presentations resulting from the example just described. FIG. 6a shows an illustrative display window generated by an executing word processor, which includes lines of text, and a mouse pointer 606 that is not hovered over any word. FIG. 6b shows the result when the mouse pointer 666 is hovered over a word for more than a specified time T and illustrates in this example the displayed bubble 668, with the retrieved information, i.e., the word definition 670.

It should be noted that for each particular application there may be a wide variety of options, choices, and differing characteristics of the bubble program. For instance, in the example given above, the definition of a word was provided. Other options might have allowed for a spelling check of the word, common examples of usage of the word, translation of the word into another language, synonyms of the word, antonyms for the word, abbreviations for the word, a thesaurus, punctuation, or even an audio pronunciation of the word. Likewise, the bubble software is not limited to solely operating on the item directly below the pointer. For example, in one embodiment, it is possible for the bubble software to look at the words or other items in any predefined region surrounding the pointer. This would allow information to be retrieved on grammar checking, possible other equivalent phrases, or even common abbreviations. Suppose for example that the bubble software were set up to look at an entire sentence for purposes of grammar checking. In that case, the bubble software, after determining the item of interest to be the sentence, "We got a communication.", might suggest the sentence, "We received a communication." Similarly, the bubble software could be set to suggest abbreviations. In that case, for example, if the bubble software found the phrase "Patent and Trademark Office," as an item of interest, it might suggest the abbreviation "PTO." The reverse is also possible, where upon encountering the acronym "PTO," the bubble software could provide a list of source words, in this case, PTO could mean, Parent-Teacher Organization, Paid Time Off, Primary Test Organization, Personal Time Off, Public Telephone Operator, or perhaps Patent and Trademark Office. Of course the bubble software might be set up to do any combination of things, like check the spelling, suggest abbreviations, etc.

The bubble software, as explained above in the discussion about FIG. 3, may interact with the application software, API, and other system resources. Through possibly one or more of these resources, the bubble software is capable of identifying such things as a pointer location, an application that is executing, information being displayed on a user's display device, etc. For example, in the case of a web browser, the bubble software by utilizing API calls can identify that a web browser is executing. Additionally, by interaction with the web browser through the Document Object Model (DOM) or related API, the bubble software given the position of the pointer, can determine the word, sentence, paragraph, etc. at that location. From this information the bubble software, in accordance with the user defined options, can determine an item of interest. It should be clear that because the bubble software is capable of determining such things as an application executing, it has the capability to provide context-relevant information. For example, if the user is using a web browser to visit a stockbroker website and positions the pointer over the displayed stock symbol of a company on the user's display device, the bubble software by using the API and other system resources could identify the stock symbol as an item of interest, retrieve information and display, for example, the name of the company, current price, Price/Earnings (P/E) ratios, volume, charts, options, futures, research ratings, or other information such as late breaking news. Similarly, if the user is using a web browser to visit a bookseller website and the pointer is hovered over the title of a book (an item of interest), the information displayed in the bubble might be price, delivery, availability, author, other books by the author, other books of the same genre, etc.

Thus, in a broader sense, it is to be understood that the bubble software is capable of performing a transaction. This transaction, as illustrated above, may be information retrieval. Additionally, if the user preferences and/or options are set for another transaction, for example, ordering, then hovering the user-operated pointer over an item of interest for ordering may effect an ordering transaction. Additionally, in the ordering example, the ordering may take place as well as retrieval and presentation of information related to the ordering, for example, information confirming that the item of interest was ordered, expected ship date, total amount, and other order status. Another example may be that of requesting a book at a library. With user options set for reserving a book, for example, a pointer hovering over a title of a book may place the book on reservation, and information on where the user is in a queue for reservation of the book may be displayed. Another example may be the activation of, for example, a user's home alarm once a pointer is hovered over a home alarm icon. Information displaying the status of the alarm system, or any intrusion alerts may be displayed. Yet another example is the pointer hovering near the name and address of, for example, a business listing, where the transaction may be the storing of the name, address, telephone number, facsimile number, email address, and web location information of the business listing to a user's address electronic book, a PDA (personal digital assistant), etc., and then displaying to the user information related to the successful completion of this transaction.

As illustrated in FIG. 4, if the information for an item is available locally at 408 on a client system, then it is displayed at 410 without the need to send an information request to a server. In the event that a request for information is sent to a server at 412, it should be realized that this server may function in any of a variety of ways. In one embodiment, the server stores the information locally at 504 and sends it back 506. In other embodiments, the user may have set preferences in the bubble program that indicate a preferred source for the information. Continuing the word definition example above, the user may have selected a particular dictionary source from a list of dictionary sources. If the server receiving the information request did not have the definition from the preferred source, then the server might look up a URL for an alternate dictionary source, retrieve the information, and then provide it to the requesting user. In this way information from a variety of sources may be retrieved. In another embodiment, the source of the information might be located in the website that the user is currently visiting. Again, as discussed above, if the user is visiting a bookseller website and the pointer hovers over a book title, the bubble software may send a request for information to the server. The server in this case may visit the same website, retrieve the information, and send it back for display. In this way the user, without clicking or performing additional action, is able to receive information that might otherwise take more time, clicks, etc. This also reduces the possibility that the user would become lost in navigating, or that a sale would be lost due to confusion of the user.

It is also possible, at the same time information is retrieved, to present to the user an advertisement (ad). In fact, some information providers might provide free information if an ad for that provider were present. This ad could be an icon, an audio jingle, text, a graphic, or even the background or shape of the bubble itself. For example, a dictionary definition provider might simply have the dictionary name after the definition. In another case, an advertiser might have paid the information provider and/or the bubble software manufacturer to include a jingle that plays every time certain information is provided.

There is also the possibility that a user may be willing to pay for the retrieved information, such as research reports on stocks. In this case, the server receiving a request for information may have accounting and security functions that determine whether the user is who he claims to be and has sufficient funds for the information; if not the server, might send a message that is displayed in the bubble informing the user what to do, whom to call, etc. In a situation where the user may have purchased, for example, a given number of accesses, to say, financial reports sent to the user on a CD where no remote access is need, the accounting, payment, and security functions may be performed on the client alone. The accounting and security functions might also be performed on a remote database, website, or any combination of local and remote resources.

Multiple suppliers might also provide information for enabling a "comparison bubble." For example, if the pointer is hovered over an International Standard Book Number (ISBN) number, then price quotes from several book vendors might be displayed in a bubble simultaneously. The order of displaying the vendor's information and the color, and size of fonts, for example, might be influenced by financial support from the vendors.

Since the information displayed in the bubble may come from a remote server, it may be dynamic in nature, meaning that it can readily change over time, such as a stock price quote. In one embodiment, the information received from the server may already be in a form ready for display. In other embodiments, it may be necessary for the client and/or the information server(s) to reformat and/or filter the data so it is in a form ready for display. It is envisioned that any existing standards for information presentation and retrieval may be used, such as HyperText Markup Language (HTML), Dynamic HyperText Markup Language (DHTML), Transmission Control Protocol/Internet Protocol (TCP/IP), HyperText Transfer Protocol (HTTP), Internet, World Wide Web (WWW), File Transfer Protocol (FTP), User Datagram Protocol (UDP), Secure Sockets Layer (SSL), extensible Markup Language (XML), Wireless Application Protocol (WAP), Wireless Markup Language (WML), standard web browsers, etc. However, it is to be understood that the bubble software is not limited to existing standards.

It is to be understood that in an embodiment where the server is formatting information, as in FIG. 5, at 516, i.e. providing filtering and/or condensing of information, which is then provided to the user, that from the user's perspective there may be an improvement in the performance of retrieving the information. The server may be attached to a higher speed connection than the client and because of this higher speed connection may retrieve information faster than the client. After receiving this information, the filtering and/or condensing reduces the amount of data that needs to be transferred to the client. This smaller amount of data takes less time to transfer to the client and so performance is improved. The filtering and/or condensing may be as simple as removing information that is not required by the user. For example, if the user has requested only the opening and closing bids on a stock, the information retrieved from, for example, a web site, may include graphics, and such unwanted ancillary information as the company's latest press release information, P/E (price/earnings) ratio, etc. By having the server filter and/or condense this information to substantially what information the user has requested, in this example, opening and closing bid price, much less information needs to be transferred to the client and performance is increased.

It is also to be understood that the "bubble" itself may take on different forms, such as a callout box, a balloon, a box, the image of a television set or computer, etc. Alternatively, the "bubble" might be a display in a menu, a task bar, etc., and may be capable of being scrolled. The bubble may also take on a variety of colors, shapes, shadings, and transparency levels. The bubble is also not necessarily static in shape, size, form, or color and thus may change over time. For example, a bubble might form at an estimated rate of information retrieval. That is if the information appears to be coming rapidly, the bubble might form rapidly. Conversely, if the information is slower to retrieve, the bubble may form more slowly, or the bubble might display ad information until the information is available. In this way the user would get feedback on the retrieval process. It is also to be understood that a visual, audio, or combination bubble presentation may be made. The properties of the bubble itself may also be under user control. For example, the shape, form, size, color, fonts, etc. may be user selectable. Also selectable may be functional characteristics of the bubble, such as, sticky bubble (bubble stays open with the information retrieved and stays.associated with the then executing application), non-sticky bubble, printable bubbles, moveable, non-moveable, persistence (length of time for presentation), multiple bubbles (open at the same time), savable bubbles (can save them to a file, or for later recall), recursive bubbles (bubbles inside other bubbles), etc. For example, the user might select during a word processing session to have a single persistent bubble moved to an unobtrusive location on the screen where all retrieved information would be displayed. The user's level of knowledge may also be a user selectable option. For example, an adult might receive a more detailed definition of a word compared to a young child, who might, if the word is considered inappropriate, a suggestion to use another word. The younger child might also receive not only a definition, but also a picture of the item the word represents if one is available. Other characteristics of the user might also be selectable, such as a native or preferred language for information displayed in the bubble. These features may be selective via menus, toolbar, dialog box, mouse or pointer clicks, keyboard, or any combination.

While it is envisioned that the bubble software would benefit greatly from the access to outside information from servers, it is to be understood that a local database, which may be contained fully within a client system, would be capable of operation without outside access. For instance, the word definition example above could be fully implemented in a user's computer system (with or without ads) and not require access to a server or other outside access. This applicability is particularly beneficial where the information is more static in nature. With increasing storage capacity, for example DVD, a bubble software enabled word processing application might contain definitions, pictures, video, sounds, translations, synonyms, abbreviations, etc.

Figure 7:
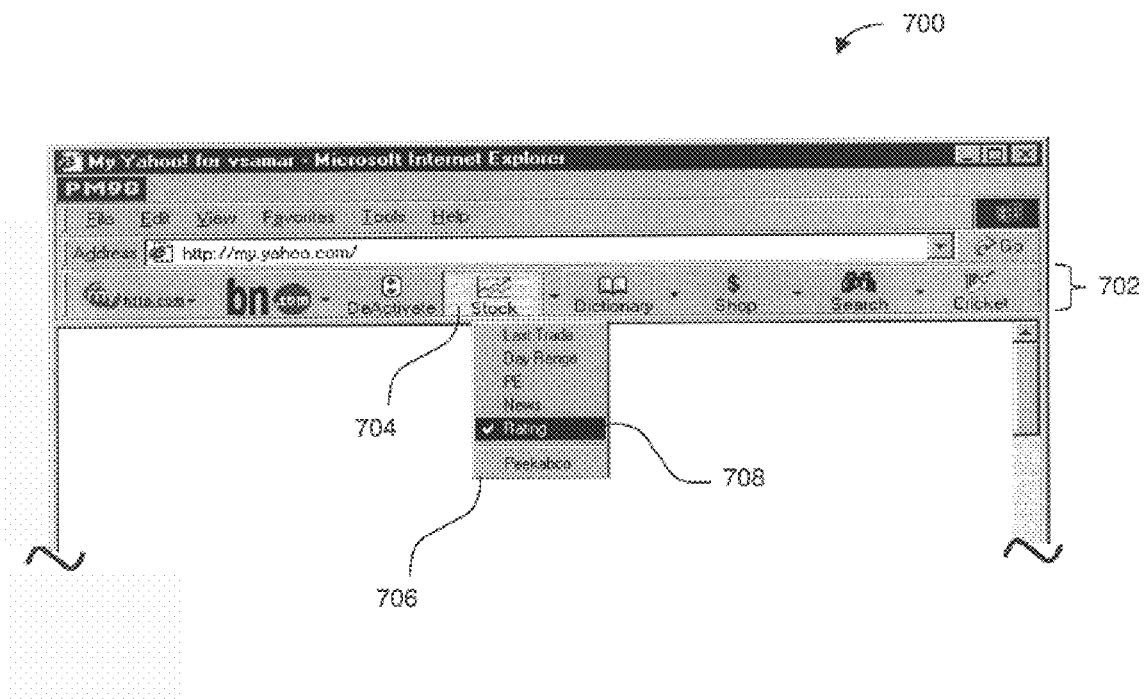
FIG. 7 is a partial screen display of one embodiment of the bubble software in a web browser environment showing a menuing approach.

FIG. 7 is a partial screen display 700 of the bubble software as illustrated in a web browser embodiment. There is a bubble software bar 702 which displays a variety of icons including a shop, dictionary, and stock 704 icon. A pull down menu 706 related to the stock icon 704 is shown with a variety of options. The selected option Rating 708 is shown. In this example, the user may have chosen to retrieve stock rating information as the information related to an item of interest.

Figure 8:
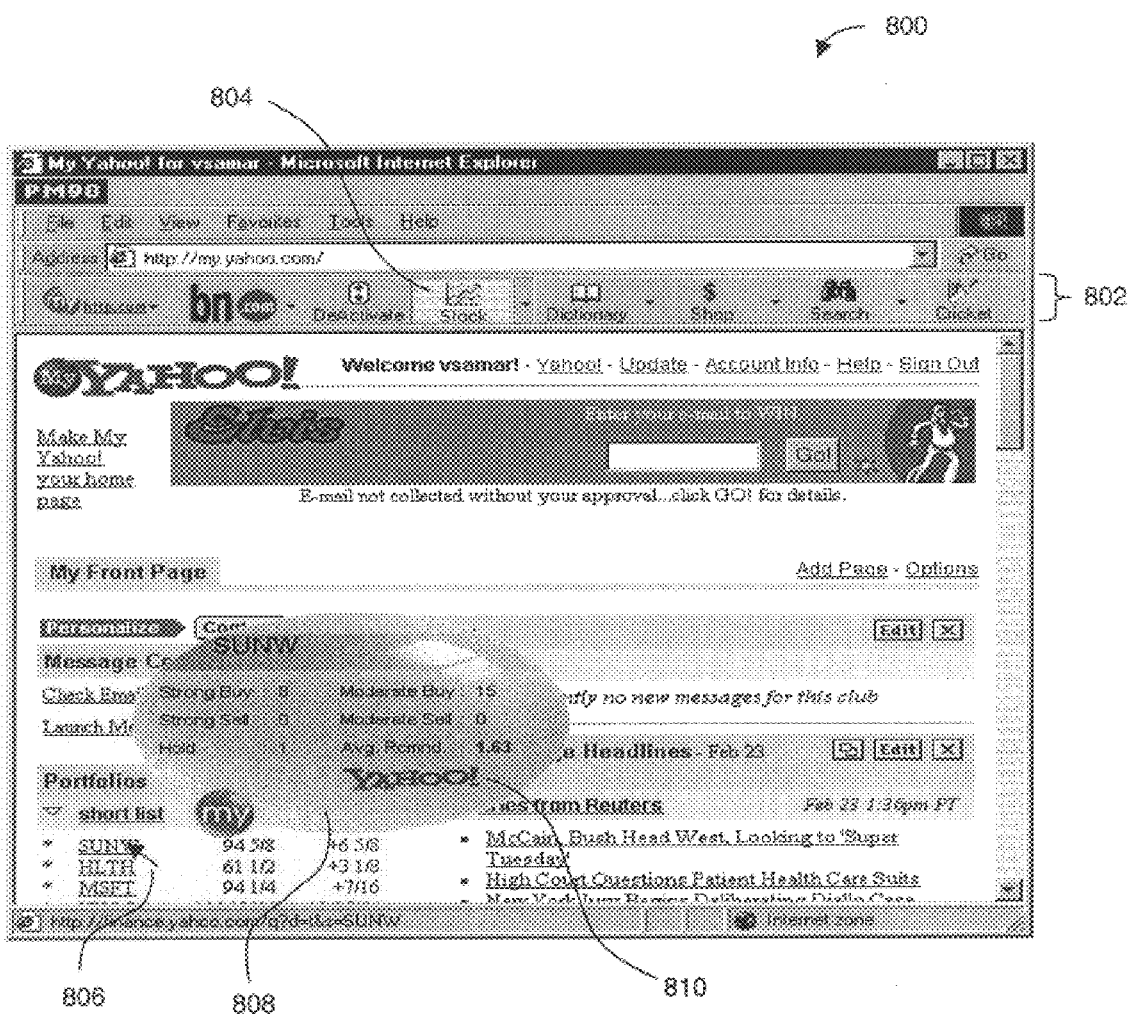
FIG. 8 is a screen display of one embodiment of the bubble software in a web browser environment illustrating display of information retrieved.

FIG. 8 is a screen display 800 generated by the bubble software, as illustrated in a web browser embodiment. Assuming the Rating settings for stock is active as illustrated in FIG. 7 and as described above, the bubble software bar 802 displays a variety of icons, including a the stock icon 804 which is indicated as active. A pointer 806 has hovered over a stock symbol (an item of interest) for a preset time, and a bubble with the Ratings information 808 has appeared on the display. Note that in addition to the Ratings information, an advertisement from a sponsor 810 (in this example, Yahoo!®) is also displayed inside the bubble 808.

Thus, a system and method for providing clickless, contextual, and dynamic information retrieval have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of providing information to a user of a processing system, the method comprising:
   providing a set of user-selectable options, including a plurality of information retrieval options, each information retrieval option corresponding to a different type of information;
   determining a position of a user-controlled pointer displayed on a display device of the processing system;
   when the position of the pointer coincides with a specified item displayed on the displayed device, sending a request for information relating to the specified item, wherein a plurality of types of information are available to said processing system for the specified item, each of the types of information corresponding to a different one of the user-selectable information retrieval options;
   receiving information to the specified item from an information source in response to the request, wherein the received information is of a type that corresponds to currently selected one of the information retrieval options; and presenting the received information to the user in association with the specified item.

2. A method as recited in claim 1, wherein the information source is selected according to which of the plurality of information retrieval options is selected.

3. A method as recited in claim 1, wherein the received information is dynamic at a location where the information is stored.

4. A method as recited in claim 1, wherein said method is performable in the processing system during execution of any of a plurality of software applications in the processing system, and wherein the nature of the received information is dependent upon which particular software application is active in the processing system when the position of the pointer coincides with the specified item.

5. A method as recited in claim 1, wherein said sending a request for information is done without any user input except the user positioning the pointer to coincide with a specified item.

6. A method as recited in claim 1, wherein the received information comprises separate elements of information aggregated from a plurality of separate information sources.

7. A method as recited in claim 1, wherein the information relating to the specified item is filtered on a remote server prior to said receiving the information.

8. A method as recited in claim 1, wherein said presenting the received information to the user comprises displaying the received information on the display device within a subset of a display area of the display device in proximity to the specified item.

9. A method as recited in claim 8, wherein presenting the received information to the user comprises superimposing the received information over images displayed on the display device.

10. A method as recited in claim 1, wherein said sending a request for information relating to the specified item comprises sending the request to a remote processing system via a network after determining that the information relating to the specified item is not present in a local database.

11. A method of providing information to a user of a processing system, the method comprising:

displaying, on a display device of the processing system, content from one of a plurality of remote content sites having content accessible from the processing system;

providing a set of user-selectable options, including a plurality of information retrieval options, each information retrieval option corresponding to a different type of information that can be retrieved, wherein the plurality of information retrieval options depend upon from which of the remote content sites the content originates;

determining a position of a user-controlled pointer displayed on the display device;

when the position of the pointer coincides with a specified item, sending a request for information relating to the specified item;

receiving information relating to the specified item from an information source in response to the request, wherein the received information is of a type that corresponds to a currently selected one of the information retrieval options and is dependent on a current context of the specified item, wherein a plurality of types of information are available to said processing system for the specified item displayed on the display device, each of the types of information corresponding to a different one of the user-selectable information retrieval options, and wherein the received information is dynamic at said information source; and displaying the received information on the display device within a subset of a display area of the display device in proximity to the specified item;

wherein said method is performed during execution of, and within a context of, a software application executing in the processing system, and wherein said method is implemented in the processing system in a software program that executes on top of the software application.

12. A method as recited in claim 11, wherein the information source is selected according to which of the plurality of information retrieval options is selected.

13. A method as recited in claim 11, wherein said method is performable in the processing system within a context of any of a plurality of software applications in the processing system, and wherein the nature of the received information is dependent upon which particular software application is active in the processing system when the position of the pointer coincides with the specified item.

14. A method as recited in claim 11, wherein the received information comprises separate elements of information aggregated by a remote server from a plurality of separate information sources.

15. A method as recited in claim 11, wherein the information relating to the specified item is filtered on a remote server prior to said receiving the information.

16. A method as recited in claim 11, wherein said displaying the received information comprises superimposing the received information over images displayed on the display device.

17. A method as recited in claim 11, wherein said sending a request for information relating to the specified item comprises sending the request to a remote processing system via a network after determining that the information relating to the specified item is not present in a local database.

18. A method of providing information to a user of a client system, the method comprising, in a server system:

receiving from the client system, over a network, a request for information related to a specified item displayed on a display device of the client system, the request having been sent by the client system when a position of a user-controlled pointer coincides with the specified item;

in response to the request, identifying information related to the specified item according to a currently selected information retrieval option, wherein the currently selected information retrieval option is one of a plurality of information retrieval options selectable by a user of the client system, wherein the identified information is of a type dependent upon the currently selected information retrieval option, and wherein the server system has access to a plurality of types of information for the specified item, each of the types of information corresponding to a different one of the user-selectable information retrieval options;

accessing the identified information from at least one information source;

filtering the accessed information according to a set of information filtering rules;

sending the filtered information to the client system over the network, for displaying on the display device of the client system in proximity to the specified item.

19. A method as recited in claim 18, wherein said identifying information comprises selecting an information source from which to access the information related to the specified item according to the currently selected information retrieval option.

20. A method as recited in claim 18, wherein the client system can execute any of a plurality of software applications in the processing system, and wherein the nature of the identified information is dependent upon which particular software application is active in the processing system when the position of the pointer coincides with the specified item.

21. A method as recited in claim 18, wherein said accessing the identified information comprises aggregating separate elements of information from a plurality of separate information sources.

22. A method as recited in claim 18, wherein the identified information is dynamic in the information source.

23. A client system comprising:

means for providing a set of user-selectable options, including a plurality of information retrieval options, each information retrieval option corresponding to a different type of information;

means for determining a position of a user-controlled pointer displayed on a display device of the client system;

means for sending, when the position of the pointer coincides with a specified item, a request for information relating to the specified item;

means for receiving information relating to the specified item from an information source in response to the request, wherein the received information is of a type that corresponds to a currently selected one of the information retrieval options, and wherein a plurality of types of information are available to said client system for the specified item displayed on the display device, each of the types of information corresponding to a different one of the user-selectable information retrieval options; and means for presenting the received information to the user in association with the specified item.

24. A client system as recited in claim 23, wherein the information source is selected according to which of the plurality of information retrieval options is selected.

25. A client system as recited in claim 23, wherein the received information is dynamic at a location where the information is stored.

26. A client system as recited in claim 23, wherein the received information is dependent on a current context of the specified item.

27. A client system as recited in claim 23, wherein the nature of the received information is dependent upon which particular software application is active in the client system when the position of the pointer coincides with the specified item.

28. A client system as recited in claim 23, wherein said sending a request for information is done without any user input except the user positioning the pointer to coincide with a specified item.

29. A client system as recited in claim 23, wherein the received information comprises separate elements of information aggregated from a plurality of separate information sources.

30. A client system as recited in claim 23, wherein the information relating to the specified item is filtered on a remote server prior to said receiving the information.

31. A client system as recited in claim 23, wherein said means for presenting the received information to the user comprises means for displaying the received information on the display device within a subset of a display area of the display device in proximity to the specified item.

32. A client system as recited in claim 31, wherein said means for presenting the received information to the user comprises means for superimposing the received information over images displayed on the display device.

33. A client system as recited in claim 23, wherein said means for sending a request for information relating to the specified item comprises means for sending the request to a remote server via a network after determining that the information relating to the specified item is not present in a local database.

34. A client system comprising:

a processor;

a display device and a memory storing a first software program which, when executed by the processor, causes content to be displayed on the display device, the content from one of a plurality of remote content sites having content accessible from the client system; the memory further storing a second software program to provide a set of user-selectable options, including a plurality of information retrieval options, each information retrieval option corresponding to a different type of information that can be retrieved, wherein the plurality of information retrieval options depend upon from which of said remote content sites the content originates; the second software program including instructions which, when executed by the processor, cause the client system to perform a processor comprising determining a position of a user-controlled pointer displayed on the display device;

when the position of the pointer coincides with a specified item, sending a request for information relating to the specified item;

receiving information relating to the specified item from an information source in response to the request, wherein the received information is of a type that corresponding to a currently selected one of the information retrieval options, and wherein the received information is dynamic at said information source; and displaying the retrieval information on the display device within a subset of a display area of the display device in proximity to the specified item;

wherein the first software program is for execution during execution of, and within a context of, the second software program, and wherein the first software program executes on top of the second software program.

35. A client system as recited in claim 34, wherein a plurality of types of information are available to the client system for the specified item displayed on the display device, each of the types of information corresponding to a different one of the user-selectable information retrieval options.

36. A client system as recited in claim 34, wherein the information source is selected according to which of the plurality of information retrieval options is selected.

37. A client system as recited in claim 34, wherein said process is performable in the client system within a context of any of a plurality of software applications in the client system, and wherein the nature of the received information is dependent upon which particular software application is active in the processing system when the position of the pointer coincides with the specified item.

38. A client system as recited in claim 34, wherein the received information comprises separate elements of information aggregated by a remote server from a plurality of separate information sources.

39. A client system as recited in claim 34, wherein the information relating to the specified item is filtered on a remote server prior to said receiving the information.

40. A client system as recited in claim 34, wherein said displaying the received information comprises superimposing the received information over images displayed on the display device.

41. A client system as recited in claim 34, wherein said sending a request for information relating to the specified item comprises sending the request to a remote processing system via a network after determining that the information relating to the specified item is not present in a local database.

42. A server system comprising:

means for receiving from the client system, over a network, a request for information related to a specified item displayed on a display device of the client system, the request having been sent by the client system when a position of a user-controlled pointer coincides with the specified item;

means for identifying, in response to the request, information related to the specified item according to a currently selected information retrieval option, wherein the currently selected information retrieval option is one of a plurality of information retrieval options selectable by a user of the client system, wherein the identified information is of a type dependent upon the currently selected information retrieval option, and wherein the server system has access to a plurality of types of information for the specified item displayed on the display device of the client system, each of the types of information corresponding to a different one of the user-selectable information retrieval options;

means for accessing the identified information from at least one information source;

means for filtering the accessed information according to a set of information filtering rules;

means for sending the filtered information to the client system over the network, for display on the display device of the client system in proximity to the specified item.

43. A server system as recited in claim 42, wherein said means for identifying information comprises means for selecting an information source from which to access the information related to the specified item according to the currently selected information retrieval option.

44. A server system as recited in claim 42, wherein the client system can execute any of a plurality of software applications in the processing system, and wherein the nature of the identified information is dependent upon which particular software application is active in the processing system when the position of the pointer coincides with the specified item.

45. A server system as recited in claim 42, wherein said means for accessing the identified information comprises means for aggregating separate elements of information from a plurality of separate information sources.

46. A server system as recited in claim 42, wherein the identified information is dynamic in the information source.

* * * * *